(12) United States Patent
Kitora et al.

(10) Patent No.: US 8,114,522 B2
(45) Date of Patent: Feb. 14, 2012

(54) RESIN COMPOSITION, LAMINATE USING THE SAME, AND MOLDED BODY USING THE LAMINATE

(75) Inventors: Yuji Kitora, Kyoto (JP); Mitsuhiro Kawahara, Kyoto (JP); Kazue Ueda, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 12/811,857

(22) PCT Filed: Feb. 16, 2009

(86) PCT No.: PCT/JP2009/000585
§ 371 (c)(1),
(2), (4) Date: Jul. 7, 2010

(87) PCT Pub. No.: WO2009/104372
PCT Pub. Date: Aug. 27, 2009

(65) Prior Publication Data
US 2010/0279135 A1     Nov. 4, 2010

(30) Foreign Application Priority Data

Feb. 20, 2008  (JP) .................................. 2008-038796
Feb. 20, 2008  (JP) .................................. 2008-038797

(51) Int. Cl.
*B32B 27/08* (2006.01)
*B32B 27/30* (2006.01)
*B32B 27/32* (2006.01)
*B32B 27/36* (2006.01)

(52) U.S. Cl. .......... 428/483; 428/480; 428/516; 525/63; 525/64; 525/67; 525/69; 525/70; 525/165; 525/166; 525/176; 525/178; 525/179; 525/183; 525/191

(58) Field of Classification Search .................. None
See application file for complete search history.

(56) References Cited

U.S. PATENT DOCUMENTS

| | | | | |
|---|---|---|---|---|
| 4,352,749 | A * | 10/1982 | Nakabayashi et al. | 525/149 |
| 5,217,812 | A * | 6/1993 | Lee | 428/461 |
| 5,441,999 | A * | 8/1995 | Jarvis et al. | 524/271 |
| 6,180,229 | B1 * | 1/2001 | Becker et al. | 428/355 BL |
| 6,183,863 | B1 * | 2/2001 | Kawachi et al. | 428/355 AC |
| 6,210,765 | B1 * | 4/2001 | Tanaka et al. | 428/35.2 |
| 6,806,317 | B2 * | 10/2004 | Morishita et al. | 525/314 |
| 6,844,077 | B2 * | 1/2005 | Squier et al. | 428/457 |
| 7,901,764 | B2 * | 3/2011 | Takase et al. | 428/314.8 |
| 7,951,438 | B2 * | 5/2011 | Lee et al. | 428/35.8 |
| 2001/0052867 | A1 * | 12/2001 | Ureshino | 341/144 |
| 2004/0191541 | A1 | 9/2004 | Squier et al. | |
| 2004/0219321 | A1 * | 11/2004 | Squier et al. | 428/40.1 |
| 2007/0111009 | A1 * | 5/2007 | Morris et al. | 428/412 |
| 2008/0076880 | A1 * | 3/2008 | Nakagawa et al. | 525/190 |
| 2008/0280117 | A1 * | 11/2008 | Knoll et al. | 428/216 |
| 2008/0311320 | A1 * | 12/2008 | Hiruma et al. | 428/34.9 |
| 2008/0311813 | A1 * | 12/2008 | Ting et al. | 442/327 |
| 2009/0018237 | A1 * | 1/2009 | Fujii et al. | 523/201 |
| 2009/0022916 | A1 * | 1/2009 | Yamada et al. | 428/34.9 |
| 2009/0054559 | A1 * | 2/2009 | Serizawa et al. | 524/9 |
| 2009/0069463 | A1 * | 3/2009 | Serizawa et al. | 524/9 |

FOREIGN PATENT DOCUMENTS

| | | |
|---|---|---|
| EP | 0202954 | 5/1986 |
| EP | 0230344 | 1/1987 |
| JP | 56-145965 | 11/1981 |
| JP | 58067772 | 4/1983 |
| JP | 61-270155 | 11/1986 |
| JP | 62-158043 | 7/1987 |
| JP | 2-232286 | 9/1990 |
| JP | 2002-019053 | 1/2002 |
| JP | 2004-182304 | * 7/2004 |
| JP | 2005-263997 | 9/2005 |
| JP | 2006-218857 | 8/2006 |
| JP | 3824846 | 9/2006 |
| JP | 2006-326952 | 12/2006 |
| JP | 2007-290314 | 11/2007 |
| JP | 2007-331822 | 12/2007 |
| JP | 2009-12464 | 1/2009 |
| JP | 2009-12465 | 1/2009 |
| WO | 2006/075634 | 7/2006 |
| WO | 2007/040261 | 4/2007 |
| WO | 2007/063973 | 6/2007 |
| WO | 2008/004510 | 1/2008 |

* cited by examiner

*Primary Examiner* — Vivian Chen

(74) *Attorney, Agent, or Firm* — Fildes & Outland, P.C.

(57) ABSTRACT

Disclosed is a resin composition forming an adhesive layer between a polylactic acid resin substrate layer and a polyolefin resin substrate layer. The resin composition includes a modified polyolefin resin (A) and a terpene resin (B), and the mass ratio (A)/(B) between the both resins (A) and (B) is 20/80 to 99/1. Alternatively, the resin composition may be a resin composition including 10 to 90% by mass of a polylactic acid resin (C), 5 to 89% by mass of the modified polyolefin resin (A) and 1 to 80% by mass of a hydrogenated petroleum resin (D), with the total amount of these resins constrained to be 100% by mass.

4 Claims, No Drawings

RESIN COMPOSITION, LAMINATE USING THE SAME, AND MOLDED BODY USING THE LAMINATE

TECHNICAL FIELD

The present invention relates to a resin composition, a laminate using the same, and a molded body using the laminate, in particular, to a resin composition for making a polylactic acid material and a polyolefin material adhere to each other, a laminate using the same and a molded body using the laminate.

BACKGROUND ART

Nowadays, from environmental considerations, resins derived from plants, which are independent of petroleum based raw materials and consequently bring small environmental loading, are attracting attention. Among such resins derived from plants, polylactic acid resins for which the raw materials are plants such as corn and sweet potato are advantageous from the viewpoint of the resources, have biodegradability, and further are excellent in transparency, heat melt moldability and heat resistance, so as to reach the stage of practical use. For example, molded bodies such as films or sheets using polylactic acid resins are put to practical use.

However, in application of these molded bodies, these molded bodies have room for improvement with respect to the mechanical properties, the barrier property and the like thereof. Examples of a technique for solving these problems may include the production of composite materials involving different types of resin materials. For example, by laminating different types of films such as a polyolefin film excellent in the barrier property and the flexibility on polylactic acid resin films, conceivably shortcomings of polylactic acid resin films may be compensated.

For the purpose of compensating the shortcomings of a polylactic acid resin substrate by laminating the polylactic acid resin substrate and a polyolefin resin substrate on each other, it is essential that both of these substrates are not delaminated at a stage of practical use so as to allow the laminate to be practically usable. However, both of these substrates barely adhere to each other. Therefore, for the purpose of making both of these substrates adhere to each other, an attempt to use an adhesive has been made (JP2006-326952A). For example, for the adhesion between a polylactic acid resin substrate and a polyolefin resin substrate or the like, an investigation with respect to the use of a polypropylene-based resin composition for use in adhesion or the use of the like has also been performed (JP2005-263997A). However, no hitherto known adhesives have attained sufficient adhesiveness with respect to the adhesive strength between a polylactic acid resin substrate and a polyolefin resin substrate, and disadvantageously delamination or the like occurs during the use of products obtained through adhesion to consequently leave room for investigation of the adhesiveness improvement.

On the other hand, it has been known to use a composition of a graft modified ethylene/α-olefin random copolymer grafted with an unsaturated carboxylic acid or a derivative thereof, as a composition for use in adhesion, to a polymer that hardly adheres to a polyolefin typified by polyester such as polyethylene terephthalate, polycarbonate or the like (JP61-270155A, JP62-158043A). However, this composition for use in adhesion does not achieve a sufficient adhesion when applied to the adhesion between the polylactic acid resin substrate and the polyolefin resin substrate.

DISCLOSURE OF THE INVENTION

Problems to be Solved by the Invention

A subject of the present invention is to solve the above-described problems and to provide a resin composition to achieve a satisfactory adhesion between a polylactic acid resin substrate layer and a polyolefin resin substrate layer, and further to provide, by using the resin composition for the adhesive layer, a laminate and a molded body each including the polylactic acid resin substrate layer and the polyolefin resin substrate layer.

Means for Solving the Problems

As a result of a diligent study, the present inventors have reached the present invention by discovering that (i) a resin composition including a modified polyolefin resin and a terpene resin and (ii) a resin composition including a polylactic acid resin, a modified polyolefin resin and a hydrogenated petroleum resin are both excellent in the adhesion to the polylactic acid resin substrate and the polyolefin resin substrate, and further, by using these resin compositions, laminates and molded bodies having satisfactory adhesiveness are obtained.

Specifically, the gist of the present invention is as follows.

(1) A resin composition forming an adhesive layer (III) between a polylactic acid resin substrate layer (I) and a polyolefin resin substrate layer (II), wherein the resin composition includes a modified polyolefin resin (A) and a terpene resin (B) and the mass ratio (A)/(B) between the both resins (A) and (B) is 20/80 to 99/1, or alternatively the resin composition includes 10 to 90% by mass of a polylactic acid resin (C), 5 to 89% by mass of the modified polyolefin resin (A) and 1 to 80% by mass of a hydrogenated petroleum resin (D), with the total amount of these resins constrained to be 100% by mass.

(2) The resin composition according to (1), wherein the terpene resin (B) is a terpene-phenol copolymer.

(3) A laminate including at least three layers, namely, the polylactic acid resin substrate layer (I), the polyolefin resin substrate layer (II) and the adhesive layer (III) disposed between the polylactic acid resin substrate layer (I) and the polyolefin resin substrate layer (II), wherein the adhesive layer (III) is formed of the resin composition including the modified polyolefin resin (A) and the terpene resin (B) with the mass ratio (A)/(B) between the both resins (A) and (B) being 20/80 to 99/1, or alternatively the resin composition including 10 to 90% by mass of a polylactic acid resin (C), 5 to 89% by mass of the modified polyolefin resin (A) and 1 to 80% by mass of a hydrogenated petroleum resin (D), with the total amount of these resins constrained to be 100% by mass.

(4) The laminate according to (3), wherein the polyolefin resin constituting the substrate layer (II) is a polypropylene resin.

(5) A molded body wherein the molded body is produced by molding the laminate according to (3) or (4).

Advantages of the Invention

The resin composition of the present invention is capable of satisfactorily making a polylactic acid resin substrate and a polyolefin resin substrate adhere to each other.

The use of the resin composition of the present invention for the adhesive layer enables to provide a laminate, excellent in delamination resistance, composed of a polylactic acid resin substrate and a polyolefin resin substrate and a molded body using the laminate.

BEST MODE FOR CARRYING OUT THE INVENTION

Hereinafter, the present invention is described in detail.

The resin composition of the present invention is a resin composition that forms an adhesive layer (III) for making a polylactic acid resin substrate layer (I) and a polyolefin resin substrate layer (II) adhere to each other.

<Polylactic Acid Resin Substrate Layer (I)>

In the present invention, the polylactic acid resin used for the substrate layer (I) is a resin produced by polymerizing lactic acids as starting materials. Specific examples of the lactic acids include L-lactic acid, D-lactic acid, DL-lactic acid, mixtures of these lactic acids and lactides that are cyclic dimmers of lactic acids.

The polylactic acid resin may be a resin produced by copolymerization. Examples of the starting materials for such copolymerization may include glycolic acid, 3-hydroxybutyric acid, 4-hydroxybutyric acid, 4-hydroxyvaleric acid, 5-hydroxyvaleric acid and 6-hydroxycarboxylic acid, and further may include cyclic ester intermediate of hydroxycarboxylic acids such as glycolide that is a glycolic acid dimer and ε-caprolactone that is a cyclic ester of 6-hydroxycaproic acid.

The method for producing the polylactic acid resin is not particularly limited; however, examples of the method for producing polylactic acid resin include a method in which L-lactic acid, D-lactic acid and DL-lactic acid are directly dehydration-polycondensed and a method in which lactide that is the lactic acid cyclic dimer is ring-opening polymerized. Instead of the polylactic acid resins obtained by these methods, commercially available polylactic acid resins may also be used. Additionally, as long as the physical properties of the resins are not impaired, the following various additives may be added to the resins: a hydrolysis resistant agent, a terminal blocking agent, a pigment, a fragrance, a dye, a delustering agent, a heat stabilizer, an antioxidant, a plasticizer, a lubricant, a release agent, a light resistant agent, an antiweathering agent, a flame retardant, an antibacterial agent, a surfactant, a surface modifier, an antistatic agent, a filler and the like.

In the present invention, the substrate layer (I) can be produced by a method in which the polylactic acid resin is pressed with a heat pressing machine or a method in which the polylactic acid resin is melt extruded from a T-die. The heat pressing conditions are, for example, such that the heat pressing temperature is 170 to 250° C., the seal pressure is 0.1 to 2 MPa and the heat pressing time is 10 to 300 seconds. The melt extrusion conditions are, for example, such that the resin is melted at 180 to 250° C. and the extruded molten resin is taken up by a casting roll set at 0 to 50° C. so as to be cooled for solidification.

The thickness of the substrate layer (I) is not particularly limited; however, the thickness of the substrate layer (I) is preferably 0.1 to 500 μm and more preferably 1 to 400 μm. The thickness of the substrate layer (I) less than 0.1 μm degrades the adhesion strength, and the thickness of the substrate layer (I) exceeding 500 μm makes difficult the molding by using the laminate obtained by using the substrate layer (I) as the case may be.

<Polyolefin Resin Substrate Layer (II)>

In the present invention, the polyolefin resin substrate layer (II) is constituted with a polyolefin resin. The polyolefin resin used for the substrate layer (II) is not particularly limited; however, from the viewpoints of the thermal contraction property, the mechanical properties and the moldability, a polypropylene resin, a polyethylene resin or the like is preferable. Among these, the polypropylene resin is particularly suitably used because the polypropylene resin is small in specific gravity, light in weight, and excellent in rigidity, strength, hinge property, stretchability, transparency and the like.

Examples of the polypropylene resin include homopropylene, random polypropylene and a mixture of these. With these polypropylene resins, a low-crystallinity resin for modification or an elastomer may be mixed. From the viewpoint of the heat resistance and the durability, isotactic polypropylene is preferable. Preferably used as the polypropylene resin substrate layer are a sheet molded by a method in which a melt-extruded sheet-shaped product formed of a polypropylene resin is rapidly cooled by using water, a metal belt or the like, a sheet molded by mixing a nucleating agent with a resin, and the heretofore known sheets, obtained by heat treating these sheets, each having a high transparency (haze: 1 to 20%/300 μm) and a high rigidity (tensile elastic modulus: 1500 to 4000 MPa).

Examples of the polyethylene resin include linear low-density polyethylene, low-density polyethylene and high-density polyethylene.

The polyolefin resin may be a polyolefin resin three-dimensionally cross-linked with an organic peroxide or the like, a partially chlorinated polyolefin resin or a copolymer with vinyl acetate, acrylic acid, methacrylic acid, maleic acid anhydride or the like.

In the present invention, the polyolefin resin substrate layer (II) can be produced by a method in which the polyolefin resin is pressed with a heat pressing machine as well as by the above-described methods for obtaining the polypropylene resin substrate layer. Alternatively, in the same manner as described above, the polyolefin resin substrate layer (II) can be produced by a method in which the polyolefin resin is melt extruded from a T-die. The heat pressing conditions are, for example, such that the heat pressing temperature is 100 to 250° C., the seal pressure is 0.1 to 2 MPa and the heat pressing time is 10 to 300 seconds. The melt extrusion conditions are, for example, such that the resin is melted at 100 to 250° C. and the extruded molten resin is taken up by a casting roll set at 0 to 50° C. so as to be cooled for solidification.

The thickness of the substrate layer (II) is not particularly limited; however, the thickness of the substrate layer (II) is preferably 0.1 to 700 μm and more preferably 1 to 500 μm. The thickness of the substrate layer (II) less than 0.1 μm degrades the adhesion strength, and the thickness of the substrate layer (II) exceeding 700 μm makes difficult the molding by using the obtained laminate as the case may be.

<Adhesive Layer (III), a First Case>

In a first aspect of the present invention, the resin composition constituting the adhesive layer (III) includes the modified polyolefin resin (A) and the terpene resin (B). The use of this resin composition for the adhesive layer (III) enables to obtain a laminate and a molded body being each excellent in the adhesion between the polylactic acid resin substrate layer (I) and the polyolefin resin substrate layer (II).

In the present invention, examples of the modified polyolefin resin (A) constituting the resin composition include the resins mainly composed of an unsaturated carboxylic acid or the anhydride thereof, or polyolefin modified with a silane coupling agent.

Examples of the unsaturated carboxylic acid and the anhydride thereof include: acrylic acid, methacrylic acid, maleic acid, maleic anhydride, citraconic acid, citraconic anhydride, itaconic acid and itaconic anhydride; the ester compounds between the monoepoxy compounds of the derivatives of these acids and anhydrides and the above-described acids; and the reaction products between these acids and the polymers having, in the molecules thereof, groups capable of reacting with these acids. The metal salts of these can also be used. Among these, maleic anhydride is more preferably used. These can be used each alone or as mixtures of two or more thereof.

Examples of the silane coupling agent for modifying polyolefin include vinyltriethoxysilane, methacryloyloxytrimethoxysilane and γ-methacryloyloxypropyltriacetyloxysilane.

The modified monomers obtained by modification with silane coupling agents may be used each alone or in combinations of two or more thereof, and the content of the modified monomer or the modified monomers is preferably 0.1 to 5% by mass of the modified polyolefin resin (A). The modified polyolefin resin (A) can be produced by copolymerizing these modified monomers at the stage of polymerizing the polymer, or alternatively by graft copolymerizing these modified monomers with a once polymerized polymer. Of these two types, graft modified polyolefin resins are preferably used as the modified polyolefin resin (A).

Specific examples of the modified polyolefin resin (A) include "Adomer" (manufactured by Mitsui Chemicals, Inc., the details of Adomer are described later) and "Modic" (manufactured by Mitsubishi Chemical Corp., the details of Modic are described later). From the viewpoint of the adhesiveness improvement intended by the present invention, it is particularly preferable to use "Adomer."

The resin composition constituting the adhesive layer (III) includes the terpene resin (B) as well as the modified polyolefin resin (A). Examples of the terpene resin (B) may include the terpene resin obtained from β-pinene, terpene phenol resin and the hydrogenated products of these resins. Particularly preferable among these is terpene phenol resin.

The softening point of the terpene resin (B) is preferably 40 to 200° C., more preferably 70 to 150° C. and particularly preferably 90 to 150° C. When the softening point is lower than 40° C., the adhesion strength tends to be degraded and the melt kneading with the modified polyolefin resin (A) tends to be difficult to perform. The weight average molecular weight of the terpene resin (B) is preferably 400 to 2000 from the viewpoints of the adhesiveness improvement and the operability including the compatibility.

Specific examples of the terpene resin (B) include "Mighty Ace (the details of Mighty Ace are described later)," "YS Polyster (a terpene-phenol resin, softening point: 100 to 150° C., weight average molecular weight: 500 to 1050)" and "Clearon (a hydrogenated terpene resin, softening point: 80 to 130° C., weight average molecular weight: 600 to 700)" (all of these three are manufactured by Yasuhara Chemical Co., Ltd.).

In the resin composition constituting the adhesive layer (III), the mass ratio (A)/(B) between the modified polyolefin resin (A) and the terpene resin (B) is required to be 20/80 to 99/1, and from the viewpoint of the adhesiveness improvement, the mass ratio (A)/(B) is preferably 50/50 to 99/1 and more preferably 70/30 to 90/10. The mass ratio (A)/(B) falling outside these ranges degrades the adhesion between the polylactic acid resin substrate layer (I) and the polyolefin resin substrate layer (II).

As long as the advantageous effects of the present invention are not impaired, the following various additives may be further added to the resin composition constituting the adhesive layer (III): a pigment, a fragrance, a dye, a delustering agent, an antioxidant, a plasticizer, a lubricant, a release agent, a light resistant agent, an antiweathering agent, a flame retardant, an antibacterial agent, a surfactant, a surface modifier, an antistatic agent, a filler and the like.

In the present invention, the adhesive layer (III) can be produced by a method in which the above-described resin composition is pressed with a heat pressing machine or a method in which the above-described resin composition is melt extruded from a T-die. The heat pressing conditions are, for example, such that the heat pressing temperature is 170 to 250° C., the seal pressure is 0.1 to 2 MPa and the heat pressing time is 10 to 300 seconds. The melt extrusion conditions are, for example, such that the resin is melted at 180 to 250° C. and the extruded molten resin is taken up by a casting roll set at 0 to 50° C. so as to be cooled for solidification.

The thickness of the adhesive layer (III) is not particularly limited; however, the thickness of the adhesive layer (III) is preferably 0.05 to 200 μm and more preferably 0.1 to 150 μm. The thickness of the adhesive layer (III) less than 0.05 μm degrades the adhesiveness, and the thickness of the adhesive layer (III) exceeding 200 μm makes difficult the molding by using the obtained laminate as the case may be.

<Adhesive Layer (III), a Second Case>

In a second aspect of the present invention, the resin composition constituting the adhesive layer (III) includes the polylactic acid resin (C), the modified polyolefin resin (A) and the hydrogenated petroleum resin (D). The use of this resin composition for the adhesive layer (III) enables to obtain a laminate and a molded body being each excellent in the adhesion between the polylactic acid resin substrate layer (I) and the polyolefin resin substrate layer (II).

In the present invention, examples of the polylactic acid resin (C) constituting the resin composition include the same resin as the polylactic acid resin used for the above-described substrate layer (I).

In the present invention, the modified polyolefin resin (A) constituting the resin composition is the same as that used in the above-described "adhesive layer (III), a first case."

This resin composition also includes the hydrogenated petroleum resin (D). In the present invention, the hydrogenated petroleum resin means the resins obtained by hydrogenating petroleum resins by heretofore known methods.

The petroleum resin means the resin mainly composed of the aromatic hydrocarbons, in oil fractions, having in the side chain thereof a polymerizable double bond and obtained by the cationic polymerization of such aromatic hydrocarbons by using Friedel-Crafts catalysts such as aluminum chloride and boron trifluoride. Examples of the polymerizable aromatic hydrocarbons specifically include various compounds such as styrene, α-methylstyrene, vinyltoluene, vinylxylene, propenylbenzene, indene, methylindene, ethylindene and coumarone. Additionally, examples of the petroleum resin also include the resins obtained by polymerizing the above-described aromatic hydrocarbons having a polymerizable double bond together with one or two or more of olefins such as butene, pentene, hexene, heptene, octene, butadiene, pentadiene, cyclopentadiene, dicyclopentadiene and octadiene. Further, examples of the petroleum resin also include the resin obtained by thermally polymerizing cyclopentadiene or dicyclopentadiene.

As the conditions for hydrogenating the petroleum resin, usually adopted are the conditions such that a metal such as nickel, palladium, cobalt, ruthenium, platinum or rhodium, or the oxide or the like of the metal is used as the hydrogenation catalyst, the temperature is set approximately at 200 to 300° C. and the pressure is set approximately at 0.98 to 29.5 MPa (10 to 300 kg/cm$^2$).

When an unhydrogenated petroleum resin is used as a component of the resin composition, the resin composition is unsatisfactory in hue, is odiferous, cannot satisfy the heating stability, and further cannot achieve the adhesiveness improvement intended by the present invention.

The softening point of the hydrogenated petroleum resin (D) is preferably 40 to 200° C., more preferably 80 to 170° C. and particularly preferably 100 to 160° C. When the softening point of the hydrogenated petroleum resin (D) is lower than 40° C., the adhesion strength tends to be degraded and the melt kneading with the polylactic acid resin (C) and the modified polyolefin resin (A) tends to be difficult to perform. The weight average molecular weight of the hydrogenated petroleum resin (D) is particularly preferably 400 to 2000 from the viewpoints of the adhesiveness improvement and the operability including the compatibility.

Examples of the hydrogenated petroleum resin (D) include "Arcon P" and "Arcon M" (both manufactured by Arakawa Chemical Industries, Ltd., the details of Arcon P and M is described later), and "Escorez 5000 Series (aliphatic petroleum resins)" (manufactured by Exxon Mobil Corp.). From the viewpoint of the adhesiveness improvement, "Arcon P" and "Arcon M" are preferable.

The resin composition constituting the adhesive layer (III) is required to include 10 to 90% by mass of the polylactic acid resin (C), 5 to 89% by mass of the modified polyolefin resin (A) and 1 to 80% by mass of the hydrogenated petroleum resin (D), with the total amount of these resins constrained to be 100% by mass. The resin composition preferably includes 20 to 80% by mass of the polylactic acid resin (C), 10 to 50% by mass of the modified polyolefin resin (A) and 1 to 50% by mass of the hydrogenated petroleum resin (D), with the total amount of these resins constrained to be 100% by mass. The resin composition more preferably includes 40 to 70% by mass of the polylactic acid resin (C), 10 to 30% by mass of the modified polyolefin resin (A) and 10 to 30% by mass of the hydrogenated petroleum resin (D), with the total amount of these resins constrained to be 100% by mass. The contents of the individual constituent resins in the resin composition falling outside the above-described ranges degrade the adhesion between the polylactic acid resin substrate layer (I) and the polyolefin resin substrate layer (II).

In the same manner as in the case of the "adhesive layer (III), a first case," as long as the advantageous effects of the present invention are not impaired, various additives may be added to the resin composition.

The production method and the thickness of the adhesive layer (III) are the same as in the case of the "adhesive layer (III), a first case."

<Laminate>

The laminate of the present invention is a laminate composed of at least three layers, namely, the polylactic acid resin substrate layer (I), the polyolefin resin substrate layer (II) and the adhesive layer (III) disposed between the polylactic acid resin substrate layer (I) and the polyolefin resin substrate layer (II).

The layer configuration of the laminate of the present invention is not particularly limited as long as the laminate of the present invention is configured to have at least three layers, namely, the polylactic acid resin substrate layer (I), the polyolefin resin substrate layer (II) and the adhesive layer (III) disposed between the polylactic acid resin substrate layer (I) and the polyolefin resin substrate layer (II). Examples of the layer configuration include the following layer configurations: (I)/(III)/(II), (I)/(III)/(II)/(III)/(II), (I)/(III)/(II)/(III)/(I) and (II)/(III)/(I)/(III)/(II). Examples of the more effective laminate configurations among these configurations include the configurations (I)/(III)/(II) and (II)/(III)/(I)/(III)/(II).

The thickness of the entire laminate is not particularly limited, and may be appropriately set according to the intended applications, demanded performances and the like; suitably, the thickness concerned is approximately 50 to 1000 μm.

As the method for producing the laminate of the present invention, a heretofore known method can be appropriately adopted. For example, the laminate having the configuration (I)/(III)/(II) can be obtained by laminating the polyolefin resin substrate layer (II) on top of the adhesive layer (III) laminated on top of the polylactic acid resin substrate layer (I) and by heat pressing these layers. The heat pressing conditions are, for example, such that the heat pressing temperature is 60 to 250° C., the seal pressure is 0.1 to 2 MPa and the heat pressing time is 1 to 300 seconds.

An additional method is a so-called coextrusion method in which the resins respectively constituting the polylactic acid resin substrate layer (I), the adhesive layer (III) and the polyolefin resin substrate layer (II) are connected, for example, from a plurality of extruders to one mouthpiece in a feed block type manner or a multi-manifold type manner. Examples of the die used for the coextrusion include a T-die, an I-die and a circular die. A laminate can be produced, for example, by a method in which an extruded sheet-shaped product or an extruded cylindrical product is rapidly cooled with a cooling casting roll, water or compressed air to be solidified in a state close to a non-crystalline state.

Further, the laminate can also be produced by adopting, for example, a method in which onto the surface of one wound-off substrate layer (I) or (II), the adhesive layer (III) and the other substrate layer (II) or (I) are heat-pressure bonded with a roll or a pressing plate.

<Molded Body>

A molded body can be obtained by molding the laminate of the present invention. Examples of the molding method include deep drawing such as vacuum molding, pneumatic molding and vacuum pneumatic molding and include punching molding. By applying such molding methods to the laminate of the present invention, the laminate of the present invention can be developed to various applications as food containers, agricultural, horticultural and industrial containers, various sundries, blister pack containers and press-through pack containers.

In particular, the use of the laminate of the present invention enables to obtain a molded body excellent in the balance between transparency, rigidity, crease performance, crease whitening resistance and other physical properties. Accordingly, the laminate of the present invention is suitable for, for example, transparent cases, transparent boxes, blister packs and food trays, and particularly suitable for assembling goods such as transparent cases and transparent boxes.

Examples of the method for forming assembling goods include a method in which a film- or sheet-shaped laminate is creased to be assembled into a box shape. In assembling into a box shape, the resin composition of the present invention is preferably used as an adhesive. Alternatively, a cyanoacrylate adhesive or a hot melt adhesive may also be used. The transparency of the laminate of the present invention is high, and hence the use of the laminate of the present invention as a box in which a commercial good is placed allows the contents to be seen through the walls of the box. It is to be noted that printing can also be applied to a portion of the laminate.

When a blister pack container is formed, first the laminate is molded into a shape having one or two or more recessed portions to house commercial goods by molding such as vacuum molding, pneumatic molding or hot plate molding, in a batch-type manner or in a continuous manner. Next, it is only necessary to turn up by heating at least two upper and lower edges or two right and left edges or three edges to form the turned-up portions for inserting a substrate made of paper or the like, a so-called cardboard, for blocking the recessed portions. The molding temperature at the time of the container molding or the heat processing temperature is preferably 150° C. or lower. Examples of the blister pack container include the containers for various commercial goods such as food, stationery, toys and dry cell batteries.

EXAMPLES

Hereinafter, the present invention is described specifically with reference to Examples. However, the present invention is not limited to following Examples.

(1) Delamination Strength

A 25-mm wide specimen was cut out from a laminate composed of a substrate layer (I)/an adhesive layer (III)/a substrate layer (II) or a molded body obtained by punching the laminate, the specimen was humidity-conditioned for one day in an environment of a temperature of 23±2° C. and a relative humidity of 60±5 RH %, and then the delamination strength of the specimen was measured at a tensile speed of 100 mm/min with a peeling angle of 180 degrees by using a tensile tester (Intesco precision universal material testing machine, Model 2020, manufactured by Intesco Co., Ltd.). This measurement was performed according to JIS K6854-2. The delamination strength was evaluated according to the following six standards A to F.

A: The delamination strength is 20 N/25 mm width or more.

B: The delamination strength is 15 N/25 mm width or more and less than 20 N/25 mm width.

C: The delamination strength is 10 N/25 mm width or more and less than 15 N/25 mm width.

D: The delamination strength is 5 N/25 mm width or more and less than 10 N/25 mm width.

E: The delamination strength is 2 N/25 mm width or more and less than 5 N/25 mm width.

F: The delamination strength is less than 2 N/25 mm width.

The materials used in below-described Examples and Comparative Examples are as follows.

(1) Polylactic Acid Resins

PLA1: Polylactic acid ("NatureWorks 4032DK," weight average molecular weight: 180,000, L-isomer: 99 mol %, D-isomer: 1 mol %, manufactured by NatureWorks LLC)

PLA2: Polylactic acid ("NatureWorks 4042DK," weight average molecular weight: 180,000, L-isomer: 96 mol %, D-isomer: 4 mol %, manufactured by NatureWorks LLC)

PLA3: Polylactic acid ("NatureWorks 4060DK," weight average molecular weight: 180,000, L-isomer: 88 mol %, D-isomer: 12 mol %, manufactured by NatureWorks LLC)

(2) Polyolefin Resins

PP1 (polypropylene resin film): Superpurelay Sheet (transparent polypropylene film, thickness: 300 μm, manufactured by Idemitsu Unitech Co., Ltd.)

PP2 (polypropylene resin): (MFR: 4.2 g/10 min (temperature: 230° C., load: 21.18 N), manufactured by Chisso Corp.)

PE (polyethylene resin): (MFR: 3.8 g/10 min (temperature: 230° C., load: 21.18 N), manufactured by Japan Polychem Co., Ltd.)

(3) Modified Polyolefin Resins

A1: Adomer SF730 (specific modified polyolefin base, Vicat softening point: 43° C., MFR: 2.7 g/10 min (temperature: 190° C., load: 21.18 N), manufactured by Mitsui Chemicals, Inc.)

A2: Adomer SF741 (specific modified polyolefin base, Vicat softening point: 50° C., MFR: 2.6 g/10 min (temperature: 190° C., load: 21.18 N), manufactured by Mitsui Chemicals, Inc.)

A3: Modic F532 (specific modified polyolefin base, Vicat softening point: 47° C., MFR: 0.8 g/10 min (temperature: 190° C., load: 21.18 N), manufactured by Mitsubishi Chemical Corp.)

A4: Modic F534A (specific modified polyolefin base, Vicat softening point: 55° C., MFR: 3.5 g/10 min (temperature: 190° C., load: 21.18 N), manufactured by Mitsubishi Chemical Corp.)

(4) Terpene Resins

B1: YS-polyester N125 (terpene-phenol copolymer, softening point: 125° C., weight average molecular weight: 650, manufactured by Yasuhara Chemical Co., Ltd.)

B2: Mighty Ace G-150 (terpene-phenol copolymer, softening point: 150° C., weight average molecular weight: 700, manufactured by Yasuhara Chemical Co., Ltd.)

B3: Mighty Ace G-125 (terpene-phenol copolymer, softening point: 125° C., weight average molecular weight: 600, manufactured by Yasuhara Chemical Co., Ltd.)

(5) Hydrogenated Petroleum Resins (D)

D1: Arcon P-140 (alicyclic saturated hydrocarbon resin, softening point: 140° C., weight average molecular weight: 860, manufactured by Arakawa Chemical Industries, Ltd.)

D2: Arcon M-135 (alicyclic saturated hydrocarbon resin, softening point: 135° C., weight average molecular weight: 860, manufactured by Arakawa Chemical Industries, Ltd.)

(6) Polyester Film

PET: Polyester film (EMBLET (SG) 75 μm, manufactured by Unitika Ltd.)

(7) Rosin Esters

R1: Pinecrystal KE-100 (super hypochromic rosin ester, softening point: 105° C., manufactured by Arakawa Chemical Industries, Ltd.)

R2: Pinecrystal KE-311 (super hypochromic rosin ester, softening point: 100° C., manufactured by Arakawa Chemical Industries, Ltd.)

R3: Pinecrystal KE-359 (super hypochromic rosin ester, softening point: 104° C., manufactured by Arakawa Chemical Industries, Ltd.)

Example 1

After 80% by mass of a modified polyolefin resin (A1) and 20% by mass of a terpene resin (B1) were dry blended with each other, the obtained mixture was mixed at an extrusion temperature of 210° C. by using a double screw extruder, Model PCM-30 (die with 3 holes of 4 mm in diameter) manufactured by Ikegai Corp. to yield a resin composition.

Next, the obtained resin composition was pressed into a film with a heat pressing machine under the conditions that the seal pressure was 0.4 MPa, the heat pressing temperature was 220° C. and the heat pressing time was 150 seconds, and thus a 150-μm thick adhesive layer (III) was obtained.

On the other hand, a polylactic acid resin (PLA1) was melted by using an extruder having a bore of 50 mm, and was extruded from a T-die into a film shape and then rapidly cooled with a casting roll and thus a polylactic acid resin substrate layer (I) formed of a 250-μm thick unstretched film was obtained.

As a polyolefin resin substrate layer (II), a 300-μm thick polypropylene resin film (PP1) was used. The polyolefin resin substrate layer (II) and the polylactic acid resin substrate layer (I) were bonded to each other through the intermediary of the adhesive layer (III) and pressed with a heat pressing machine under the conditions that the seal pressure was 0.2 MPa, the heat pressing temperature was 230° C. and the heat pressing time was 5 seconds, and thus a 700-μm thick laminate composed of the polylactic acid resin substrate layer (I)/the adhesive layer (III)/the polyolefin resin substrate layer (II) was obtained. Additionally, by punching molding of the obtained laminate, a box-type molded body was obtained.

The results thus obtained for Example 1 are shown in Table 1.

Example 8

A polylactic acid resin (PLA1), a polypropylene resin (PP2) and the resin composition obtained in Example 1 were respectively placed in extruders, melted at a temperature set at 230° C., then coextruded from a three-feed-triple-layer die and taken up by a casting roll set at 20° C. so as to be cooled for solidification, and thus a 300-μm thick laminate (PLA1/resin composition/PP2) composed of an unstretched laminate film was obtained. Additionally, a molded body was obtained by using the obtained laminate, in the same manner as in Example 1.

The results thus obtained for Example 8 are shown in Table 1.

Examples 9 to 13

As shown in Table 1, in each of Examples 9 to 13, the type of the terpene resin (B) was altered, and otherwise in the same manner as in Example 1, a resin composition was obtained.

TABLE 1

| | | Laminate configuration | | | | | | Property Delamination strength | |
|---|---|---|---|---|---|---|---|---|---|
| | | Polylactic acid resin substrate layer (I) | Resin composition forming the adhesive layer (III) | | | | Polyolefin resin substrate layer (II) | Lamination method | | |
| | | | Modified polyolefin resin (A) | | Terpene resin (B) | | | | | |
| | | Type | Type | % by mass | Type | % by mass | Type | | Laminate | Molded body |
| Examples | 1 | PLA1 | A1 | 80 | B1 | 20 | PP1 | Pressing | B* | B |
| | 2 | PLA1 | A1 | 80 | B2 | 20 | PP1 | Pressing | A* | B |
| | 3 | PLA1 | A1 | 80 | B3 | 20 | PP1 | Pressing | A* | B |
| | 4 | PLA1 | A2 | 80 | B1 | 20 | PP1 | Pressing | B | B |
| | 5 | PLA1 | A3 | 80 | B1 | 20 | PP1 | Pressing | C | C |
| | 6 | PLA1 | A4 | 80 | B1 | 20 | PP1 | Pressing | C | C |
| | 7 | PLA1 | A1 | 55 | B1 | 45 | PP1 | Pressing | C | C |
| | 8 | PLA1 | A1 | 80 | B1 | 20 | PP2 | Coextrusion | B | B |
| | 9 | PLA1 | A1 | 80 | B2 | 20 | PP2 | Coextrusion | A | B |
| | 10 | PLA1 | A1 | 80 | B3 | 20 | PP2 | Coextrusion | A | B |
| | 11 | PLA2 | A1 | 80 | B1 | 20 | PP2 | Coextrusion | B | B |
| | 12 | PLA2 | A1 | 80 | B2 | 20 | PP2 | Coextrusion | A | B |
| | 13 | PLA2 | A1 | 80 | B3 | 20 | PP2 | Coextrusion | A | B |
| | 14 | PLA1 | A1 | 80 | B1 | 20 | PE | Coextrusion | C | C |
| | 15 | PLA1 | A1 | 20 | B1 | 80 | PP1 | Pressing | C | C |
| | 16 | PLA1 | A1 | 30 | B1 | 70 | PP1 | Pressing | C | C |
| | 17 | PLA1 | A1 | 50 | B1 | 50 | PP1 | Pressing | C | C |
| | 18 | PLA1 | A1 | 70 | B1 | 30 | PP1 | Pressing | B | C |
| | 19 | PLA1 | A1 | 90 | B1 | 10 | PP1 | Pressing | B | C |
| | 20 | PLA1 | A1 | 99 | B1 | 1 | PP1 | Pressing | C | D |
| Comparative Examples | 1 | PLA1 | — | — | — | — | PP1 | Pressing | F | F |
| | 2 | PLA1 | A1 | 100 | — | — | PP1 | Pressing | D | F |
| | 3 | PLA1 | A1 | 10 | B1 | 90 | PP1 | Pressing | F | F |
| | 4 | PLA1 | A1 | 80 | (R1) | 20 | PP1 | Pressing | E | F |
| | 5 | PLA1 | A1 | 80 | (R2) | 20 | PP1 | Pressing | E | F |
| | 6 | PLA1 | A1 | 80 | (R3) | 20 | PP1 | Pressing | E | F |
| | 7 | (PET) | A1 | 80 | B1 | 20 | PP1 | Pressing | E | F |

*Substrate breakage

Examples 2 to 7

As shown in Table 1, in each of Examples 2 to 7, the types and the proportions of the modified polyolefin resin (A) and the terpene resin (B) were altered, and otherwise in the same manner as in Example 1, a resin composition, an adhesive layer, a laminate and a molded body were obtained.

The results thus obtained for Examples 2 to 7 are shown in Table 1.

The obtained resin compositions were used and the resins shown in Table 1 were used as the polylactic acid resins constituting the substrate layer (I). Otherwise in the same manner as in Example 8, coextrusion was performed and thus laminates were obtained. Further, by using the obtained laminates, molded bodies were obtained in the same as in Example 1.

The results thus obtained for Examples 9 to 13 are shown in Table 1.

Example 14

As shown in Table 1, polyethylene resin (PE) was used as the polyolefin resin constituting the polyolefin resin substrate layer (II). Otherwise, by coextruding in the same manner as in Example 8, a laminate was obtained. Additionally, by using the obtained laminate, a molded body was obtained in the same manner as in Example 1.

The results thus obtained for Example 14 are shown in Table 1.

Examples 15 to 20

As shown in Table 1, in each of Examples 15 to 20, the ratio between the modified polyolefin resin (A) and the terpene resin (B) was altered, and otherwise in the same manner as in Example 1, a resin composition, an adhesive layer, a laminate and a molded body were obtained.

The results thus obtained for Examples 15 to 20 are shown in Table 1.

Comparative Example 1

As shown in Table 1, a polylactic acid resin substrate layer (I) and a polypropylene resin film (PP1) constituting the polyolefin resin substrate layer (II) were bonded to each other without the intermediary of the adhesive layer (III) and were pressed in the same manner as in Example 1, to yield a laminate composed of the polylactic acid resin substrate layer (I)/the polyolefin resin substrate layer (II) in which the thickness of these two layers was 550 µm. Additionally, by using the obtained laminate, a molded body was obtained in the same manner as in Example 1.

The results thus obtained for Comparative Example 1 are shown in Table 1.

Comparative Examples 2 and 3

As shown in Table 1, in each of Comparative Examples 2 and 3, the ratio between the modified polyolefin resin (A) and the terpene resin (B) was altered, and otherwise in the same manner as in Example 1, a resin composition, an adhesive layer, a laminate and a molded body were obtained.

The results thus obtained for Comparative Examples 2 and 3 are shown in Table 1.

Comparative Examples 4 to 6

As shown in Table 1, in each of Comparative Examples 4 to 6, a rosin ester was used in place of the terpene resin (B), and otherwise in the same manner as in Example 1, a resin composition, an adhesive layer, a laminate and a molded body were obtained.

The results thus obtained for Comparative Examples 4 to 6 are shown in Table 1.

Comparative Example 7

As shown in Table 1, polyethylene terephthalate resin (PET) was used as the resin constituting the substrate layer (I), and otherwise in the same manner as in Example 1, a 520-µm thick laminate and a molded body were obtained.

The results thus obtained for Comparative Example 7 are shown in Table 1.

As shown in Table 1, the use of the resin compositions of the present invention as the adhesive layer (III) between the polylactic acid resin substrate layer (I) and the polyolefin resin substrate layer (II) improved the adhesiveness of the laminate, and drastically improved the adhesiveness as compared to Comparative Examples 1 to 7. In particular, in Examples 1 to 3, the adhesive strength excelled to such an extent that the polylactic acid film that was the polylactic acid resin substrate layer (I) underwent substrate breakage in the peel test.

In this connection, the adhesiveness improvement effects were seen even when the resin compositions of the present invention were once converted into films and then laminated on the substrate layer (I) and the substrate layer (II) (Examples 1 to 7), or even when the laminates were produced by coextruding the resin compositions of the present invention together with the resins constituting the substrate layer (I) and the substrate layer (II) (Examples 8 to 14).

On the contrary, in Comparative Example 1, no adhesive layer (III) was disposed, and hence the adhesiveness was unsatisfactory; in Comparative Example 2, the adhesive layer (III) was formed of 100% by mass of a modified polyolefin resin and included no terpene resin, and hence the adhesiveness was unsatisfactory; and in Comparative Example 3, the mass ratio of the modified polyolefin resin was too low beyond the range of the present invention, and hence the adhesiveness was unsatisfactory.

In Comparative Examples 4 to 6, a rosin ester having a tackifying effect similarly to a terpene resin was used and the adhesive layer was formed by using this rosin ester in place of the terpene resin, but the adhesiveness was low. Consequently, it was found that the terpene resin contributed to the adhesiveness improvement of the resin composition of the present invention.

In Comparative Example 7, polyethylene terephthalate was used for the substrate layer (I), but no satisfactory adhesiveness was exhibited.

As described above, the resin compositions of the present invention, according to Examples 1 to 20, were the resin compositions capable of constituting the adhesive layer (III) suitable for improvement of the adhesion between the polylactic acid resin substrate (I) and the polyolefin resin substrate (II), and accordingly it was possible to obtain the laminates and the molded bodies in which the polylactic acid resin substrate layer (I) and the polyolefin resin substrate layer (II) were included and the polylactic acid resin substrate layer (I) and the polyolefin resin substrate layer (II) were made to satisfactorily adhere to each other.

Example 21

After 60% by mass of a polylactic acid resin (PLA1), 20% by mass of a modified polyolefin resin (A1) and 20% by mass of a hydrogenated petroleum resin (D1) were dry blended with each other, the obtained mixture was mixed, in the same manner as in Example 1, at an extrusion temperature of 210° C. by using a double screw extruder, Model PCM-30 manufactured by Ikegai Corp. to yield a resin composition.

Next, the obtained resin composition was pressed into a film with a heat pressing machine under the conditions that the seal pressure was 0.4 MPa, the heat pressing temperature was 220° C. and the heat pressing time was 150 seconds, and thus a 150-µm thick adhesive layer (III) was obtained.

On the other hand, a polylactic acid resin (PLA1) was melted by using an extruder having a bore of 50 mm, and was extruded from a T-die into a film shape and then rapidly cooled with a casting roll and thus a polylactic acid resin substrate layer (I) formed of a 250-µm thick unstretched film was obtained.

As a polyolefin resin layer (II), a 300-μm thick polypropylene resin film (PP1) was used. The polypropylene resin film and the polylactic acid resin substrate layer (I) were bonded to each other through the intermediary of the adhesive layer (III) and pressed with a heat pressing machine under the conditions that the seal pressure was 0.2 MPa, the heat pressing temperature was 230° C. and the heat pressing time was 5 seconds, and thus a 700-μm thick laminate composed of (I)/(III)/(II) was obtained. Additionally, by punching molding of the obtained laminate, a box-type molded body was obtained.

The results thus obtained for Example 21 are shown in Table 2.

The results thus obtained for Example 32 are shown in Table 2.

Examples 33 to 35

As shown in Table 2, in each of Examples 33 to 35, the type of the hydrogenated petroleum resin (D) was altered, and otherwise in the same manner as in Example 21, a resin composition was obtained. The obtained resin compositions were used, and as the polylactic acid resins constituting the substrate layer (I), the resins shown in Table 2 were used. Otherwise in the same manner as in Example 32, laminates

TABLE 2

| | | Laminate configuration | | | | | | | | Property | |
| | | Polylactic acid resin substrate layer (I) | Resin composition forming the adhesive layer (III) | | | | | | Polyolefin resin substrate layer (II) | Lamination method | Delamination strength | |
| | | | Polylactic acid resin (C) | | Modified polyolefin resin (A) | | Hydrogenated petroleum resin (D) | | | | | |
| | | Type | Type | % by mass | Type | % by mass | Type | % by mass | Type | | Laminate | Molded body |
|---|---|---|---|---|---|---|---|---|---|---|---|---|
| Examples | 21 | PLA1 | PLA1 | 60 | A1 | 20 | D1 | 20 | PP1 | Pressing | C | C |
| | 22 | PLA1 | PLA1 | 60 | A1 | 20 | D2 | 20 | PP1 | Pressing | C | C |
| | 23 | PLA1 | PLA2 | 60 | A1 | 20 | D1 | 20 | PP1 | Pressing | C | C |
| | 24 | PLA1 | PLA3 | 60 | A1 | 20 | D1 | 20 | PP1 | Pressing | C | C |
| | 25 | PLA1 | PLA1 | 60 | A2 | 20 | D1 | 20 | PP1 | Pressing | C | C |
| | 26 | PLA1 | PLA1 | 60 | A3 | 20 | D1 | 20 | PP1 | Pressing | D | D |
| | 27 | PLA1 | PLA1 | 60 | A4 | 20 | D1 | 20 | PP1 | Pressing | D | D |
| | 28 | PLA1 | PLA1 | 70 | A1 | 15 | D1 | 15 | PP1 | Pressing | C | C |
| | 29 | PLA1 | PLA1 | 40 | A1 | 30 | D1 | 30 | PP1 | Pressing | D | D |
| | 30 | PLA1 | PLA1 | 60 | A1 | 30 | D1 | 10 | PP1 | Pressing | C | C |
| | 31 | PLA1 | PLA1 | 60 | A1 | 10 | D1 | 30 | PP1 | Pressing | D | D |
| | 32 | PLA1 | PLA1 | 60 | A1 | 20 | D1 | 20 | PP2 | Coextrusion | C | C |
| | 33 | PLA1 | PLA1 | 60 | A1 | 20 | D2 | 20 | PP2 | Coextrusion | C | C |
| | 34 | PLA2 | PLA1 | 60 | A1 | 20 | D1 | 20 | PP2 | Coextrusion | C | C |
| | 35 | PLA2 | PLA1 | 60 | A1 | 20 | D2 | 20 | PP2 | Coextrusion | C | C |
| | 36 | PLA1 | PLA1 | 60 | A1 | 20 | D1 | 20 | PE | Coextrusion | D | D |
| Comparative Examples | 8 | PLA1 | — | — | — | — | D1 | 100 | PP1 | Pressing | Unable to form sheet | |
| | 9 | PLA1 | PLA1 | 60 | A1 | 40 | — | — | PP1 | Pressing | E | E |
| | 10 | PLA1 | PLA1 | 60 | — | — | D1 | 40 | PP1 | Pressing | E | E |
| | 11 | PLA1 | — | — | A1 | 60 | D1 | 40 | PP1 | Pressing | E | E |
| | 12 | PLA1 | PLA1 | 60 | A1 | 20 | (R1) | 20 | PP1 | Pressing | E | E |
| | 13 | (PET) | PLA1 | 60 | A1 | 20 | D1 | 20 | PP1 | Pressing | F | F |

Examples 22 to 31

In each of Examples 22 to 31, the types and the proportions of the polylactic acid resin (C), the modified polyolefin resin (A) and the hydrogenated petroleum resin (D) were altered as shown in Table 2, and otherwise in the same manner as in Example 21, a resin composition, an adhesive layer, a laminate and a molded body were obtained.

The results thus obtained for Examples 22 to 31 are shown in Table 2.

Example 32

A polylactic acid resin (PLA1), a polypropylene resin (PP2) and the resin composition obtained in Example 21 were respectively placed in extruders, melted at a temperature set at 230° C., then coextruded from a three-feed-triple-layer die and taken up by a casting roll set at 20° C. so as to be cooled for solidification, and thus a 300-μm thick laminate ((I)/(III)/(II)=PLA1/resin composition/PP2) composed of an unstretched laminate film was obtained. Additionally, a molded body was obtained by using the obtained laminate, in the same manner as in Example 1.

were obtained by coextrusion. Additionally, by using the obtained laminates, molded bodies were obtained in the same manner as in Example 21.

The results thus obtained for Examples 33 to 35 are shown in Table 2.

Example 36

As shown in Table 2, as the polyolefin resin constituting the substrate layer (II), polyethylene resin (PE) was used. Otherwise in the same manner as in Example 32, a laminate was obtained by coextrusion. Additionally, by using the obtained laminate, a molded body was obtained in the same manner as in Example 21.

The results thus obtained for Example 36 are shown in Table 2.

Comparative Examples 8 to 11

As shown in Table 2, in each of Comparative Examples 8 to 11, the proportions of the polylactic acid resin (C), the modified polyolefin resin (A) and the hydrogenated petroleum resin (D) were altered, and otherwise in the same manner as in Example 21, a resin composition, an adhesive layer, a laminate and a molded body were obtained.

The results thus obtained for Comparative Examples 8 to 11 are shown in Table 2.

Comparative Example 12

As shown in Table 2, a rosin ester R1 was used in place of the hydrogenated petroleum resin (D), and otherwise in the same manner as in Example 21, a resin composition, an adhesive layer, a laminate and a molded body were obtained.

The results thus obtained for Comparative Example 12 are shown in Table 2.

Comparative Example 13

As shown in Table 2, polyethylene terephthalate resin (PET) was used as the resin constituting the substrate layer (I), and otherwise in the same manner as in Example 21, a 520-μm thick laminate and a molded body were obtained.

The results thus obtained for Comparative Example 13 are shown in Table 2.

As shown in Table 2, when the resin compositions of the present invention, according to Examples 21 to 36, were used as the adhesive layer (III) between the polylactic acid resin substrate layer (I) and the polyolefin resin substrate layer (II), the adhesiveness of each of the laminates was improved, so as to drastically improve the adhesiveness as compared to Comparative Examples 1 and 2 shown in Table 1 and Comparative Examples 8 to 13 shown in Table 2.

Specifically, the adhesiveness improvement effects were seen even when the resin compositions of the present invention were once converted into films and then laminated on the substrate layer (I) and the substrate layer (II) (Examples 21 to 31), or even when the laminates were produced by coextruding the resin compositions of the present invention together with the resins constituting the substrate layer (I) and the substrate layer (II) (Examples 32 to 36).

On the contrary, in any one of Comparative Example 2 shown in Table 1 and Comparative Examples 8 to 11 shown in Table 2, at least any one of the polylactic acid resin (C), the modified polyolefin resin (A) and the hydrogenated petroleum resin (D) was not used, and hence the delamination strength was low and the adhesiveness of the laminate and the adhesiveness of the molded body were poor.

In Comparative Example 12, a rosin ester R1 having a tackifying effect similarly to the hydrogenated petroleum resin (D) was used and the adhesive layer was formed by using this rosin ester in place of the hydrogenated petroleum resin (D), but the adhesiveness was low. Consequently, it was found that the hydrogenated petroleum resin (D) contributed to the adhesiveness improvement of the resin composition constituting the adhesive layer (III) of the present invention.

In Comparative Example 13, as the resin constituting the substrate layer (I), polyethylene terephthalate was used, but no satisfactory adhesiveness was exhibited.

As described above, the resin composition of the present invention, according to each of Examples 21 to 36, was a resin composition suitable, as the adhesive layer (III) between the polylactic acid resin substrate (I) and the polyolefin resin substrate (II), for the improvement of the mutual adhesion between the substrate (I) and the substrate (II). This resin composition enabled to obtain a laminate and a molded body each including the polylactic acid resin substrate (I) and the polyolefin resin substrate (II).

The invention claimed is:

1. A resin composition forming an adhesive layer (III) between a polylactic acid resin substrate layer (I) and a polyolefin resin substrate layer (II),
    wherein the resin composition comprises 40 to 70% by mass of a polylactic acid resin (C), 15 to 20% by mass of a modified polyolefin resin (A) mainly composed of an unsaturated carboxylic acid or an anhydride thereof, or a polyolefin modified with a silane coupling agent, and 10 to 20% by mass of an alicyclic saturated hydrocarbon resin (D), with the total amount of these resins constrained to be 100% by mass.

2. A laminate comprising at least three layers, namely, a polylactic acid resin substrate layer (I), a polyolefin resin substrate layer (II) and an adhesive layer (III) disposed between the polylactic acid resin substrate layer (I) and the polyolefin resin substrate layer (II),
    wherein the adhesive layer (III) comprises 40 to 70% by mass of a polylactic acid resin (C), 15 to 20% by mass of a modified polyolefin resin (A) mainly composed of an unsaturated carboxylic acid or the anhydride thereof, or the polyolefin modified with a silane coupling agent, and 10 to 20% by mass of an alicyclic saturated hydrocarbon resin (D), with the total amount of these resins constrained to be 100% by mass.

3. The laminate according to claim 2, wherein the polyolefin resin constituting the substrate layer (II) is a polypropylene resin.

4. A molded body wherein the molded body is produced by molding the laminate according to claim 2.

* * * * *